United States Patent [19]

Dufresne et al.

[11] Patent Number: 4,738,940
[45] Date of Patent: Apr. 19, 1988

[54] NOVEL HYDROCRACKING OR CRACKING CATALYST FOR HYDROCARBON CHARGES

[75] Inventors: Pierre Dufresne, Rueil-Malmaison; Christian Marcilly, Houille, both of France

[73] Assignee: Institut Francais du Petrole, Rueil-Malmaison, France

[21] Appl. No.: 39,832

[22] Filed: Apr. 16, 1987

Related U.S. Application Data

[63] Continuation of Ser. No. 717,775, Mar. 29, 1985, abandoned.

[30] Foreign Application Priority Data

Mar. 30, 1984 [FR] France .................. 84 03350

[51] Int. Cl.$^4$ .............................. B01J 29/10
[52] U.S. Cl. ........................ 502/66; 502/74
[58] Field of Search ....................... 502/66, 74

[56] References Cited

U.S. PATENT DOCUMENTS 4,120,825 10/1978 Ward ..................... 502/64

FOREIGN PATENT DOCUMENTS 895873 5/1983 France .

*Primary Examiner*—Carl F. Dees
*Attorney, Agent, or Firm*—Millen & White

[57] ABSTRACT

The invention relates to a novel hydrocarbon hydroconversion catalyst. This catalyst is a mixture of a matrix and a zeolite, the zeolite having a molar ratio $SiO_2/Al_2O_3$ comprised between about 8 and 70, a sodium content below 0.15% by weight, a parameter a of the elementary mesh comprised between $24.55 \times 10^{-10}$ m and $24.24 \times 10^{-10}$ m, a sodium ion take-up capacity $C_{Na}$ expressed in grams of sodium per 100 grams of the modified zeolite, higher than 0.85%, a specific surface higher than 400 $m^2 \cdot g^{-1}$, a water vapor adsorption capacity at 25° C. (at a P/Po ratio equal to 0.10) higher than 6%, a pore distribution comprised between 1 to 20% of the pore volume, contained in pores of diameter situated between 20 and $80 \times 10^{-10}$ m, the remainder of the volume being essentially contained in pores of diameter less than $20 \times 10^{-10}$ m. The pore volume V (desorption isotherm of nitrogen) and the micropore distribution DV/dD are demonstrated particularly in FIG. 1.

10 Claims, 1 Drawing Sheet

NOVEL HYDROCRACKING OR CRACKING CATALYST FOR HYDROCARBON CHARGES

This application is a continuation, of application Ser. No. 717,775 filed Mar. 29, 1985 (abandoned).

BACKGROUND OF THE INVENTION

The present invention relates to a novel hydroconversion catalyst for heavy petroleum fractions, comprising as basic constituent at least one acid zeolite of the specially modified Y type.

The hydrocracking or cracking of heavy petroleum fractions are very important processes of refining which enable the production from surplus, low value heavy charges of lighter fractions such as light distillates and fuels, jet fuels and light gas oils which are sought by the refiner to adapt his production to the structure of the market. With respect to catalytic cracking, the advantage of catalytic hydrocracking is to provide middle distillates, jet fuels and gas oils of very good quality. On the other hand, the gasoline produced has a much lower octane number than that derived from catalytic cracking.

The invention relates to a novel catalyst containing particularly (a) a matrix and (b) a particular zeolite, this catalyst being utilizable either in hydrocracking reactions or in cracking reactions.

The catalysts used in hydrocracking are all of the bifunctional type associating an acid function with a hydrogenating function. The acid function is contributed by supports of large surface areas (150 to 800 $m^2.g^{-1}$ approximately) having a surface acidity, such as halogenated aluminas (chlorinated or fluorinated particularly), combinations of boron and aluminum oxides, amorphous silica-aluminas and zeolites. The hydrogenating function is contributed either by one or several metals of group VIII of the periodic classification of the elements, such as nickel, palladium or platinum for example, or by an association of at least two metals selected from group VI of the periodic classification, molybdenum and tungsten particularly, and VIII of the same classification, cobalt and nickel particularly, two at least of the metals of this association belonging to two different groups (VI and VIII previously mentioned).

The balance between the two acid and hydrogenating functions is a fundamental parameter which governs the activity and selectivity of the catalyst. A weak acid function and a stronger hydrogenating function give catalysts of little activity, operating generally at high temperature (390° C. approximately), and at a low volumetric feed rate (VVH expressed by volume of charge processed per unit volume of catalyst and per hour is generally less than or equal to 2, but endowed with very good selectivity of middle distillates. Conversely, strong acid function and weak hydrogenating function give very reactive catalysts but which have poor selectivity of middle distillates.

Thus, it is one of the great advantages of hydrocracking to show great flexibility at various levels: flexibility, at the level of the types of catalyst used, which results in flexibility at the level of the charges processed and at the level of the products obtained. An easy parameter to control is the acidity of the support of the catalyst.

In supports of little acidity, are found the family of amorphous silica-aluminas. Many catalysts on the hydrocracking market are constituted by silica-alumina associated, either with a metal of group VIII, or preferably when the content of heteroatomic poisons of the charge to be processed exceed 0.5% by weight, with an association of sulphides of the metals of groups VI B and VIII. These systems have very good selectivity of middle distillates, and the products formed are of good quality. These catalysts, for the less acid among them, may also produce lubricant bases. The drawback of all these catalytic systems based on an amorphous support, is, as has been stated, their low activity.

Acid zeolites present the advantage with respect to the other previously mentioned acid supports of contributing a much higher acidity. The new catalysts which contain them are therefore much more active and for this reason, enable operation at a lower temperature and/or at a higher volumetric feed rate (VFR). On the other hand, this higher acidity modifies the equilibrium between the two acid and hydrogenating catalytic functions. There results therefrom a notable modification of selectivity of these catalysts with respect to conventional catalysts: they have more cracking ability and produce consequently much more gasoline than middle distillates.

The present invention relates to a novel type of catalyst containing 2 to 80% by weight, preferably 3 to 50% of a zeolite whose physical characteristics and acidity have been specially modified, and which has an activity and selectivity of middle distillates particularly improved with respect to other systems of the prior art based on zeolites.

The zeolite used in the catalyst of the present invention is an HY acid zeolite characterised by various specifications, of which the methods of determination will be specified in description below; a molar ratio $SiO_2/Al_2O_3$ comprised between 8 and 70 and preferably between about 12 and 40; a sodium content less than 0.5% by weight determined on the zeolite calcined at 1100° C.; a crystalline parameter a with an elementary mesh comprised between $24.55 \times 10^{-10}$ m and $24.24 \times 10^{-10}$ m and preferably between $24.38 \times 10^{-10}$ m and $24.26 \times 10^{-10}$ m and a capacity $C_{Na}$ of sodium ion take-up, expressed in grams of Na per 100 grams of modified zeolite, neutralised and then calcined, higher than about 0.85 (the capacity $C_{Na}$ of sodium ion take-up will be defined more precisely in the following paragraph); a specific surface area determined by the B.E.T. method higher than about 400 $m^2.g^{-1}$ and preferably higher than 550 $m^2/g$, a water vapor adsorption capacity at 25° C. for a partial pressure of 2.6 torrs (346.6 Pa) higher than about 6%, a pore distribution comprising between 1 and 20% and preferably between 3 and 15% of the pore volume contained in pores of diameter situated between 20 and 80 Å, (20 and $80 \times 10^{-10}$ m) the remainder of the pore volume being contained in pores of diameter less than $20 \times 10^{-10}$ m.

The various characteristics are measured by the method specified below:

the molar ratio $SiO_2/Al_2O_3$ is measured by chemical analysis. When the amounts of aluminum become low, for example less than 2%, for more accuracy it is opportune to use a method of determination by atomic adsorption spectometry.

the mesh parameter is calculated from the X-ray diffraction diagram, by the method described by ASTM card D 3. 942-80. It is clear that to carry out this calculation correctly, the crystallinity of the product must be sufficient.

The specific surface area is determined by measurement of the nitrogen absorption isotherm at the temperature of liquid nitrogen and calculated by the conventional B.E.T. method, the specimens are pre-treated, before the measurement, at 500° C. with dry nitrogen flushing.

the pore distribution is determined by the B.J.H. method described by BARRETT, JOYNER and HALENDA in the Journal of the American Chemical Society, volume 73, page 373–1951. This method is based on the numerical exploitation of the nitrogen desorption isotherm. The measurement is carried out with a CARLO EPRA type SORPTOMATIC 1800 Series apparatus. The results are expressed by the values of the porevolume V as a function of the diameter of the pores D; the derivative curve is also presented: dV/dD as a function of D. The total pore volume is defined as the volume of nitrogen absorbed at saturation, more exactly at a partial pressure corresponding to a ratio between the partial pressure and the saturating vapor pressure P/Po equal to 0.99.

the percentages of water take-up (or water vapor adsorption capacity) are determined by means of a conventional gravimetric apparatus. The specimen is pretreated at 400° C. under a primary vacuum then brought to a stable temperature of 25° C. A water pressure of 346.6 Pa is then admitted, which corresponds to a ratio P/Po of about 0.10 (ratio between the partial pressure of water admitted into the apparatus, and the saturated vapor pressure of water at a temperature of 25° C.).

the exchange capacity of the sodium ions $C_{Na}$ (or sodium ion take-up capacity) is determined in the following manner: a gram of zeolite is subjected to three successive changes in 100 cm$^3$ of 0.2 M NaCl solution, for one hour at 20° C. with good stirring. The solutions are left at a natural pH during the exchange. In fact if the pH were readjusted to values close to 7 by the addition of small amounts of soda, the sodium levels exchanged would be higher. It is expressed as grams of sodium per 100 grams of modified zeolite, re-exchanged the calcined at 1100° C.

It has been discovered in the present invention that stabilized Y zeolites corresponding to the aforementioned specifications had remarkable properties;

These zeolites are manufactured, generally from a Y-Na zeolite, by a suitable combination of the two basic treatments: (a) a hydrothermic treatment which associates temperature and partial pressure of water vapor, and (b) an acid treatment, by, a strong and concentrated inorganic acid.

Generally the Y-Na zeolite from which the zeolite according to the invention is prepared possesses a molar ratio SiO$_2$/Al$_2$O$_3$ comprised between about 4 and 6; it is convenient at first to lower the sodium content (by weight) thereof to a value of the order of 1 to 3% and preferably to less than 2.5%; Y-Na zeolite moreover generally possesses a specific surface area comprised between 750 and 950 m/g approximately.

Several modifications exist of the preparation which all follow the hydrothermic treatment of the zeolite by an acid treatment. Hydrothermic treatments are operations known in the Prior Art and enable the production of so-called stabilised or again ultra-stabilized zeolites. Thus MACDANIEL and MAYER claimed in U.S. Pat. No. 3,293,192 the production of so-called ultra-stable zeolite Y characterised by a crystalline parameter of 24.45 to 24.2 and low percentages of sodium, due to the association of hydrothermic treatments and cationic exchanges by solutions of ammonium salt, KERR et al. have also obtained Y zeolites enriched in silica by selective extraction of the aluminum by means of a chelating agent such assethyylene diamine tetraacetic acid (U.S. Pat. No. 3,442,795).

EBERLY et al have combined the two latter techniques for the production of dealurinised zeolites (U.S. Pat. Nos. 3,506,400 and 3,591,488). They show that the hydrothermic treatment consists of selectively extracting the tetracoordinated aluminum from the aluminosilicate frame. They claim this procedure as well as the subsequent treatment by solutions containing various cations. One example is given with subsequent extraction by 0.1 N HCl resulting in a faujasite no longer containing aluminum.

WARD describes the manufacture of zeolithic catalysts intended for the manufacture of middle distillates (U.S. Pat. No. 3,853,742). The zeolite is stabilized but it is not subjected to an acid treatment at the end of the series of treatments, and its crystalline parameter is comprised between 24.40×10$^{-10}$ m and 24.50×10$^{-10}$ m. BEZMAN and RABO have used as a base hydrocracking catalysts from more highly stabilized zeolites, whose crystalline parameter varies from 24.20×10$^{-10}$ m to 24.45×10$^{-10}$ m (EP Pat. No. 0028938). This type of zeolite is more particularly characterised by a ion exchange capacity "IEC" less than 0.07. The exchange capacity is defined in this patent as:

IEC: (Ion Exchange Capacity)

$$IEC = k \frac{[Na_2O] \text{ mol}}{[SiO_2] \text{ mol}}$$

k being the molar ratio SiO$_2$/Al$_2$O$_3$ determined before the retroexchange with the NA+ ions. A zeolite of molar ratio SiO$_2$/Al$_2$O$_3$ equal to k and of IEC equal to 0.07 corresponds to the approximate formula:

$$H_{0.93} Na_{0.07} AlO_2 (SiO_2)_{k/2}$$

The sodium ion take-up capacity of such a product, expressed in g per 100 g, is:

$$C_{Na} = \frac{23 \times 0.07}{(23 \times 0.07) + 0.93 + 59 + \left(60 \times \frac{k}{2}\right)} \times 100$$

When k=4.8, $C_{Na}$=0.78
When k=10, CNa=0.45

Hence for a value of IEC less than or equal to 0.07, the sodium ion take-up capacity C is in all cases less than 0.8, (k is higher than 4.8 for a stabilized zeolite).

Zeolite ultra-stabilized by the method of BEZMAN and RABO is also characterised by a hydrophobic character, such as its water absorption capacity at 25° C. and a value of P/Po of 0.1 namely less than 5%.

SCHERZER (Journal of Catalysis 54, 285, 1978) synthesised by a combination of hydrothermic and acid treatments, and characterised by X-ray diffraction zeolites very much enriched in silica (molar ratio SiO$_2$/Al$_2$O$_3$ 100). At the same period, V. BOSACEK et al carried out also similar treatments to obtain an ultra-stable zeolite ratio SiO$_2$/Al$_2$O$_3$ of the order of 75.

These products are too highly dealuminised and for this reason, their interest for hydrocracking is doubtful. In fact a minimum of aluminum atoms must be maintained in the structure to keep sufficient acidity in the structure necessary for the hydrocracking catalyst;

Belgian patent No. 896,873 indicates the possibility of effecting hydrocracking to produce middle distillates by means of a catalyst containing Y zeolites treated with water vapor and then lixiviated. This ultra-stabilised zeolite is characterised by different parameters, particularly a molar ratio $SiO_2/Al_2O_3$ higher than 10, a crystalline parameter less than $24.4 \times 10^{-10}$ m; and a particular mesopore distribution. The porosity of a Y zeolite, untreated with water vapor and by acid is entirely comprised of pores of diameter less than $20 \times 10^{-10}$ m.

The ultra-stabilisation treatments modify this distribution. In this Belgian Patent No. 895,873, the treatments described create a meso pore centred at about $80 \times 10^{-10}$ m for a zeolite treated with water vapor and at about $135 \times 10^{-10}$ m for the same zeolite subjected subsequently to acid treatment.

GENERAL DESCRIPTION OF THE INVENTION

It has now been observed that zeolites preferred as components of hydrocracking catalysts intended to produce middle distillates must have an average acidity, that is to say a molar ratio $SiO_2/Al_2O_3$ comprised between 8 and 70 and preferably 12 and 40. A crystallinity kept at least at the level of 45%, which corresponds to a specific surface of 400 m2/g, preferably 60%, which corresponds to a specific surface area of 550 m²/g, a pore distribution comprising between 1 and 20% and preferably between 3 and 15% of the pore volume contained in pores of diameter situated between 20 and $80 \times 10^{-10}$ m, the remainder of the pore volume being contained essentially in pores of diameter less than $20 \times 10^{-10}$ m.

The creation of secondary microporosity towards the pore diameters comprise between 20 and $80 \times 10^{-10}$ m, as well as the absence of mesopores beyond $80 \times 10^{-10}$ m is a characteristic of the invention.

It has in fact been observed that the catalyst thus prepared gives superior results in hydrocracking of heavy cuts to produce middle distillates.

Without prejudging all the basic reasons which lead to the remarkable properties of these product, some hypotheses may be advanced.

The modification of these zeolites must be done whilst arranging for several contradictory exigencies: an increase in the $SiO_2/Al_2 O_3$ ratio, the creation of secondary microporosity, preservation of crystallinity. The increase in the $SiO_2/Al_2 O_3$ ratio, ratio involves profound remodelling of the structure which must be carried out under well defined experimental conditions, lest there be partial or total destruction of the crystalline network. Good crystallinity must be preserved in the zeolite, that it is to say an organised three-dimensional network of silicon atoms must be maintained, in which some atoms of aluminum subsist with their associated protons. However within this microporous three dimensional framework, there must in addition be formed a secondary microporosity which permits the diffusion process and accessibility of heavy molecules to the acid sites to be facilitated. The hydrocracking charges processed by this type of catalyst are cuts of initial boiling point generally above about 350° C. and hence generally the average number of carbon atoms of a representative molecule is situated between 20 and 40; the bulk of these molecules is considerable and the diffusion limits are prejudicial to the activity of the catalyst. It is therefore advantageous to create a secondary microporosity in the zeolite which permits the diffusion processes and accessibility to the acid sites to be facilitated.

In the bifunctional hydrocracking mechanism it is important also that the molecular transfers between the acid sites and the hydrogenating sites should be rapid. In fact dehydrogenated products like olefins, desorption products of the carbocations, coming from the acid sites, must be rapidly hydrogenatable under risk of undergoing other transformations at another acid site. These products are in fact very reactive, and after the readsorption they can either be recracked or be combined with other molecules and give polycondensations. These two phenomena are both prejudical to the sound operation of the catalyst, the first leads to overcracking and degrades the selectivity of middle distillates to the advantage to the production of gasoline or even gas; secondly leads to coke formation and degrades the stability of the catalyst. The importance of facilitating the diffusion steps in the catalyst is therefore seen. We have however observed that this secondary microporosity, had to be created by pores whose diameter must not exceed $80 \times 10^{-10}$ m lest the crystallinity of the zeolite should be affected.

The zeolite is shaped in a matrix which may be an alumina which contains mesopores. Hence this gives overall a catalyst which has a primary microprosity less than $20 \times 10^{-10}$ m, due to the crystalline framework of the zeolite, a secondary microprosity comprised between 20 and $80 \times 10^{-10}$ m, due to crystalline defects in the zeolite lattice, and lastly, a mesoporosity due to the matrix with which the zeolite is mixed.

This type of ultra-stable zeolite is obtained by a combination of hydrothermic treatment and treatments in the aqueous phase whilst taking the two following precautions:

the hydrothermic stabilized treatments must be carried out under relatively more gentle conditions than the conventional processes of the Prior Art which enable so-called ultra-stabilised zeolites to be obtained, such as those described by MACDANIEL and MAHER (U.S. Pat. No. 3,293,192), or BEZMAN and RABO (EP Patent No. 0028938), so that the Si/Al ratio of the alumino-silicate framework should not be too high. A hydrothermic treatment is fully defined by the conjunction of three operational variables, which are: temperature, time, partial water vapor pressure. The sodium ion content of the starting material is also important to the extent that the latter partly block the dealumination process and facilitate the destruction of the lattice. The optimum conditions of the hydrothermic treatment will be specified below.

The preparation of the zeolite must terminate by a treatment in acid medium. It has been observed that the last step had an important influence on the activity and the selectivity of a hydrocracking catalyst constituted by a thus-modified Y zeolite, with a hydrogenating matrix and function.

This acid treatment of the stabilized zeolite has important consequences on the physico-chemical properties of the zeolite. It modifies the specific surface area (measured by the BET method) of the zeolite. The surface area of an unmodified NaY zeolite is comprised between 750 and 950 m²/g and more currently between 800 and 900 m²/g and that of a stabilised Y zeolite of crystalline parameter less than $24.50 \times 10^{-10}$ m is currently comprised between 350 and 750 m²/g, according to the severity of the hydrothermic treatment adopted. After acid extraction, the surface area rises again to 100 or even 250 m²/g according to the type of treatment, which causes the value of the surface area to pass between 450 and 900 m²/g. This result shows that the structure has thus been partially or totally freed from aluminic species taking up space in the channels, and partly clogging the microporosity. This treatment slightly increases the water adsorption properties of the zeolites so prepared. It also reduces substantially the crystalline parameter of the mesh. The drop due to this treatment is situated between 0.04 and 0.4%, or generally between 0.1 and 0.3%. Finally it permits the secondary microporosity situated between $20 \times 10^{-10}$ m and $80 \times 10^{-10}$ m pore diameter to be increased. The optimum conditions of the acid treatment will be indicated below.

A hydrocracking catalyst, containing a zeolite so prepared tested with a residue, hydrotreated under vacuum or another conventional heavy charge from hydrocracking is much more active and selective in middle distillates than a catalyst of the Prior Art containing a stabilised zeolite. Without prejudging the reasons for this improvement, it can be said that the type of treatment adopted has modified the nature and the strength of the acid function of the catalyst as well as the accessibility of the site to heavy hydrocarbon molecules, which typically comprise 20 to 40 carbon atoms.

The zeolite whose characteristics satisfy the previously defined criteria is dispersed in a matrix generally amorphous based on alumina, silica, silica-alumina, alumina-boron oxide, magnesia, silica-magnesia, zirconia, titanium oxide or based on a combination of two at least of the preceding oxides, or again based on a clay, or on a combination of the preceding oxides with clay. This matrix has essentially the role of helping to put the zeolite into form, in other words of producing in the form of agglomerates, beads, extrudates, tablets etc., which could be placed in an industrial reactor. The proportion of matrix in the catalyst is from about 20 to 98% by weight and preferably 50 to 95%.

The hydro-dehydrogenation component of the catalyst of the present invention is for example a compound of a metal of group VIII of the periodic classification of the elements, (particularly nickel, palladium or platinum), or a combination of at least two of the preceding compounds, or a combination of metal compounds (particularly oxides) of groups VI (molybdenum and/or tungsten particularly) and non noble metals of group VIII (cobalt and/or nickel particularly) of the periodical classification of the elements.

The final catalyst must comprise between 2 and 80% by weight of specially modified zeolite, and preferably between 3 and 50%. The concentrations of the metallic compounds, expressed by weight of metal are as follows; 0.01 to 5% by weight of metals of group VIII, and preferably between 0.03 and 3% by weight, in the case where only noble metals of the palladium or platinum type are concerned, 0.01 to 15% by weight of group VIII metals, and preferably between 0.05 to 10% by weight, in the case where non noble metals of group VIII of the nickel type, for example are concerned; when both at least one metal or compound of a metal of group VIII and at least one compound of a metal of group VI are used about 5 to 40% by weight of a combination of at least one compound (particularly oxide) of a metal of group VI (molybdenum or tungsten particularly) and at least one metal or compound of a metal of group VIII (cobalt or nickel particularly) and preferably 12 to 30%, are employed, with a ratio by weight (expressed in metallic oxides) of metals of group VIII to metals of group VI comprised between 0.5 and 0.8 and preferably between 0.13 and 0.5.

Various methods of preparation may be envisaged according to the type of product desired. There are two principal modifications which differ in the number of hydrothermic treatments necessary. For products which are stabilized from an average to a high degree, that is to say dealuminised from an average to a high degree at the level of the alumino-silicate framework, a single treatment may suffice; for very highly stabilized products, two treatments prove to be necessary. The Prior Art uses currently the crystalline parameter values to locate the stabilisation level.

To obtain products whose crystalline parameter measured at the end of the preparation sequence is situated between $24.27 \times 10^{-10}$ m and $24.55 \times 10^{-10}$ m (stabilized from an average to a high degree), it is econimically advantageous to operate with only a single hydrothermic treatment. The starting NaY zeolite conventionally has a molar ratio $SiO_2/Al_2O_3$ comprised between 4 and 6 and a crystalline parameter comprised between $24.60 \times 10^{-10}$ m and $24.80 \times 10^{-10}$ m and more generally between $24.65 \times 10^{-10}$ m and $24.75 \times 10^{-10}$ m. Before carrying out the hydrothermic treatment, the sodium level must be lowered to less than 3% by weight and preferably less than 2.5% by weight. This is effected conventionally by repeated exchanges in solutions of an ionizable ammonium salt, such as the nitrate, the chloride, the sulphate or equivalents. The $NH_4NaY$ zeolite so obtained can now be calcined under the following conditions: temperature comprised between about 500° and 800° C. and preferably between 600° and 800° C., partial pressure of water vapour comprised between about 0.05 and 10 bar and preferably between 0.1 and 5 bar, time at least 20 minutes and preferably greater than one hour.

The so-stabilised zeolite is treated with a dilute solution of an organic or inorganic acid, such as hydrochloric, nitric, sulfuric, phosphoric, acetic, oxalic, formic acids or equivalents.

To obtain zeolites of parameter ranging from $24.24 \times 10$ m to $24.35 \times 10^{-10}$ m, it is possible to resort to two hydrothermic treatment steps. The first is carried out under conditions which can be gentle on a product whose sodium level can be relatively high, and still less than 3.5% and preferably than 2.8% at a temperature comprised between 500° and 700° C., with a partial water vapor pressure of 20 torrs (0.026 bar) and a time of at least 20 minutes and if possible greater than one hour. The product then undergoes one or several exchanges in solution of an ionizable ammonium salt, or again in solutions of an organic or inorganic acid, provided however that the pH of the final solution is not less than 0.5. It is also possible to use a combination of these two types of exchange or to mix the acid with a solution of ammonium salts. The sodium ratio is then less than 1% and preferably than 0.7%. There then intervenes a second hydrothermic treatment carried out under more severe conditions than the first, namely at a temperature comprised between 600° and 880° C. and preferably between 600° and 830° C., (the temperature of the second hydrothermic treatment being higher than about 100° to 250° C. and preferably 160° to 230° C. at the temperature of the first treatment) a partial vapor pressure comprised between 0.05 and 10 bar and preferably between 0.1 and 5 bar and a time of at least 30 minutes and preferably greater than one hour.

The one or more hydrothermic treatments followed by one or several extraction treatments in solutions of an organic or inorganic acid, such as hydrochloric, nitric, sulfuric, chloric, phosphoric acetic, oxalic, formic acids or equivalents. It is also possible to use complexing agents known in the Prior Art, such as ethylene diamine tetracetic, acetyl acetone or equivalents. However the preferred treatments are carried out with solutions of hydrochloric or nitric acid, of a normality comprised between 0.1 and 11 N preferably between 0.3 and 3 N. To adapt the crystallinity of the zeolite it may be advantageous to procede with several successive gentle treatments that is to say in acid solutions of low normality, rather than a single treatment under more severe conditions, that is to say in a concentrated acid in order to remove equivalent amounts of aluminum and sodium; the acid treatment thus described can always be followed or preceded by one of several conventional exhanges with ammonium salts in order to reduce further the sodium content of the final zeolite. This ion exchange may without inconvenience be carried out simultaneously with acid treatment by adding the acid to the aqueous ammonium salt solution. It is also possible after these acid treatments to proceed with exchanges with cations of metals of group II A, with cations of rare earths, or again cations of chromium and of zinc, or with any other element useful for improving the catalyst.

The HY or NH$_4$Y zeolite obtained can be introduced at this stage, into one of the previously mentioned amorphous matrices. One of the preferred methods in the present invention consists of malaxating the zeolite in a moist alumina gel for some tens of minutes, then passing the paste so obtained through a die to form extrudates of diameter comprised between 0.4 and 4 mm.

The hydrogenating function as previously defined (metals of group VIII or association of metal oxides of groups VI and VIII) may be introduced into the catalyst at various levels of the preparation and in various ways.

It can be introduced in part only (case of associations of metal oxides of groups VI and VIII) or in totality at the time of mixing the zeolite with the oxide gel selected as matrix.

It may be introduced in one or several ion exchange operations on a calcined support constituted by the HY zeolite dispersed in the selected matrix, by means of solutions containing salts precursors of the selected metals when the latter belong to group VIII. It can be introduced in one or several impregnation operations of the shaped and calcined support, by a solution of precursors of oxides of metals of groups VIII (Co and/or Ni particularly) when the precursors of the oxides of the metals of group VI (Mo and/or W) have previously been introduced at the time of malaxation of the support. It can lastly be introduced in one or several impregnation operations of the calcined support constituted by HY zeolite and the matrix, by solution containing the precurstors of metal oxides of group VI and/or or group VIII, the precursors of the oxides of metals of group VIII being preferably introduced after those of group VI or at the same time as the latter. The principal precursor salts which xcan be used are for example:

for group VIII (cobalt or nickel): nitrate, acetate, sulphate of hydrated bivalent cations of of hexammine cations

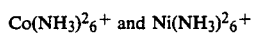

for group VI (Mo and W); the various known ammonium molybdates or tungstates.

In the case where the oxides of the metals are introduced in several impregations of corresponding precursor salts, one intermdiate calcination step of the catalyst should be carried out at a temperature comprised between 250° and 600° C.

The impregnation of the molybdenum may be facilitated by the addition of phosphoric acid in ammonium paramolybdate solutions.

The catalysts thus obtained are used for the hydrocracking of heavy fractions, and show an improved activity with respect to the Prior Art, and have in addition an improved selectivity for the production of middle distillates of good quality.

The charges employed in this process either are gas oils, vacuum gas oils, deasphalted or hydrotreated residues or equivalents. They are constituted at least with 80% by volume of compounds whose boiling points are situated between 350° and 580° C. They contain heteroatoms such as sulphur and nitrogen. The conditions of hydrocracking such as temperature pressure, hydrogen recycling ratio, hourly volumic speed, must be adapted to the nature of the charge, characterised particularly by the range of boiling points, the content of aromatic or polyaromatic substances, the heteroatom content. The nitrogen contents are generally comprised between 5 and 2000 ppm, and the sulfur contents between 50 and 30,000 ppm.

the temperature is generally above 230° C. and often comprised between 300° and 430° C. The pressure is greater than 15 bar and is generally greater than 30 bar. The hydrogen recycling ratio is at a minimum of 100 and often comprised between 260 and 3000 liters of hydrogen per liter of charge. The hourly volumetric speed is comprised generally between 0.2 and 10.

The results which are significant to the refiner are the activity and the selectivity of middle distillates. The fixed objectives must be realised under conditions compatible with economic factors. Thsu the refiner seeks to reduce temperature, pressure, hydrogen recycling ratio and to maximise the hourly volumetric speed. It is known that the conversion can be increased by a rise in temperature, but this is often to the detriment of the selectivity. The selectivity of middle distillates is improved with an increase in pressure or of the hydrogen recycling ratio, but this at the expense of the economy of the process. This type of catalyst enables the achievement under conventional operating conditions of selectivities of distillates of boiling point comprised between 150° and 380° C. higher than 65%, and this for conversion levels, into products of boiling point less than 380°, over 55% by volume. This catalyst shows in addition, under these conditions, a remarkable stability, which is due particularly to the large specific surface area of the product. Finally, due to the fact of the composition of the catalyst and the quality of the zeolite, the catalyst is easily regenerated.

It has also been observed in the present invention that the zeolites described above and prepared as indicated above, are particularly suitable as constituents of a catalytic cracking catalyst, which contains thus by weight (a) 50 to 95% of at least one matrix selected from the group constituted by silica-aluminas, silicamagnesias and clays, with possibly additionally in said matrix at least one other solid selected form the group constituted by aluminas, silicas, zirconias, alumina boron oxide, magnesias, titanium oxide, (b) 5 to 50% of a zeolite, containing in addition possibly one or several metallic elements currently used in cracking catalyst, in particular, the metals of the family of rare earths, the catalysts according to the invention being able also advantageously to contain minimal amounts, less than 1000 ppm, for example, of rhenium or of a noble metal of the family of platinum (platinum, palladium, iridium, osmium, rhodium, ruthenium,) and/or another metal (for example 0.01 to 5%) in the form of oxide particularly such as manganese, iron, cobalt, nickel, chromium and manganese etc. . . .

The general conditions of catalytic cracking reactions are particularly well known not to be repeated here within the scope of the present invention (see for example U.S. Pat. Nos. 3,293,192, 3,449,070, 4,415,438, 3,518,051, 3,607,043.

In order that the invention may be more fully understood, preferred embodiments thereof are described below purely by way of non limiting examples.

DESCRIPTION OF PREFERRED EMBODIMENTS

The several examples given below indicate the characteristics of the invention:

EXAMPLE 1

Figure 1:
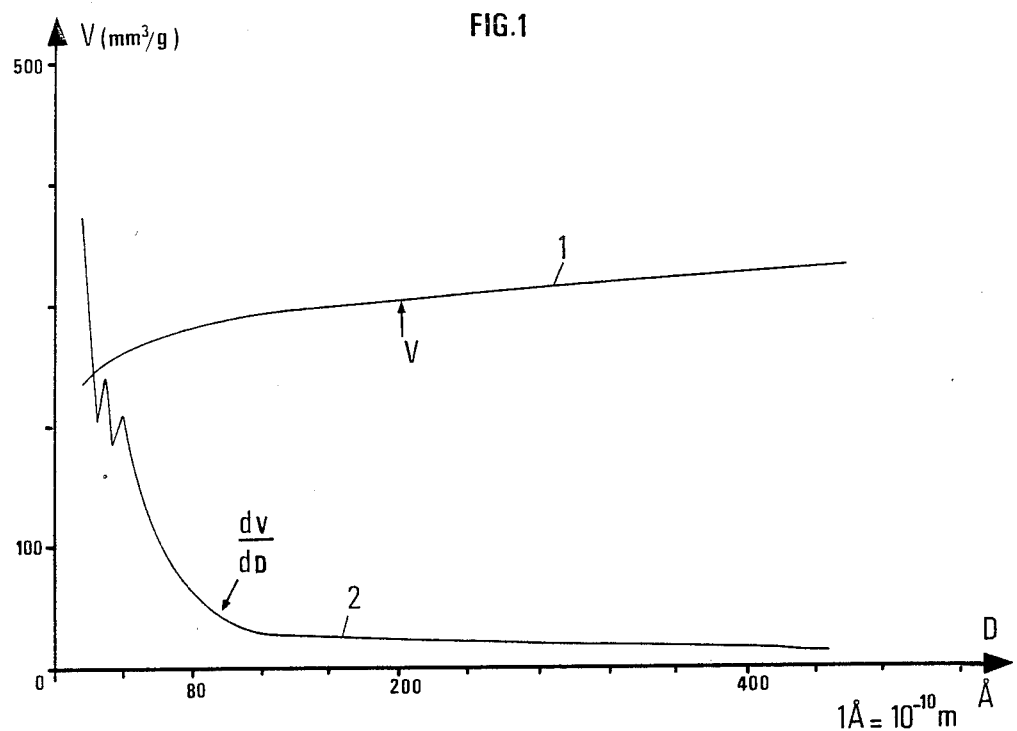

An NaY zeolite of formula Na $AlO_2$ $(SiO_2)_{2.5}$ is used.
This zeolite whose characteristics are:
$SiO_2/Al_2O_3$ molar ratio: 5
Crystalline parameter: $24.69 \times 10^{-10}$ m
Water vapor adsorption capacity: 26% at 25° C. (P/Po: 0.1)
Specific surface area: 880 m²/g
is subjected to five consecutive exchanges in ammonium nitrate solutions of concentration 2 M, at a temperature of 95° C., for a time of 1h30, and with a ratio volume of solution to weight of zeolite equal to 8, the sodium ratio of the NaNH$_4$Y zeolite obtained is 0.95%. This product is then introduced rapidly into a preheated oven at 770° C. and left for 4 hours in a static atmosphere. Zeolite is then subjected to two exchanges by solutions of ammonium nitrate so the sodium ratio drops to 0.2%. The molar ratio $SiO_2/Al_2O_3$ is then 6.3, the crystalline parameter $24.38 \times 10^{-10}$ m, the surface 625 m²/g, the water take-up capacity 11.3% (at P/Po=0.1) and the sodium ion take-up capacity 2. The desorption isotherm of the nitrogen and the micropore distribution are shown in FIG. 1 where the diameter D of the pores is shown as abscissae, in Å (1 Å=$10^{-10}$ m) and as ordinates the volume of nitrogen. Curve 1 represents the pore volume V (desorption isotherm of the nitrogen), Curve 2 represents dV/dD (micropore distribution)

EXAMPLE 2

Figure 2:
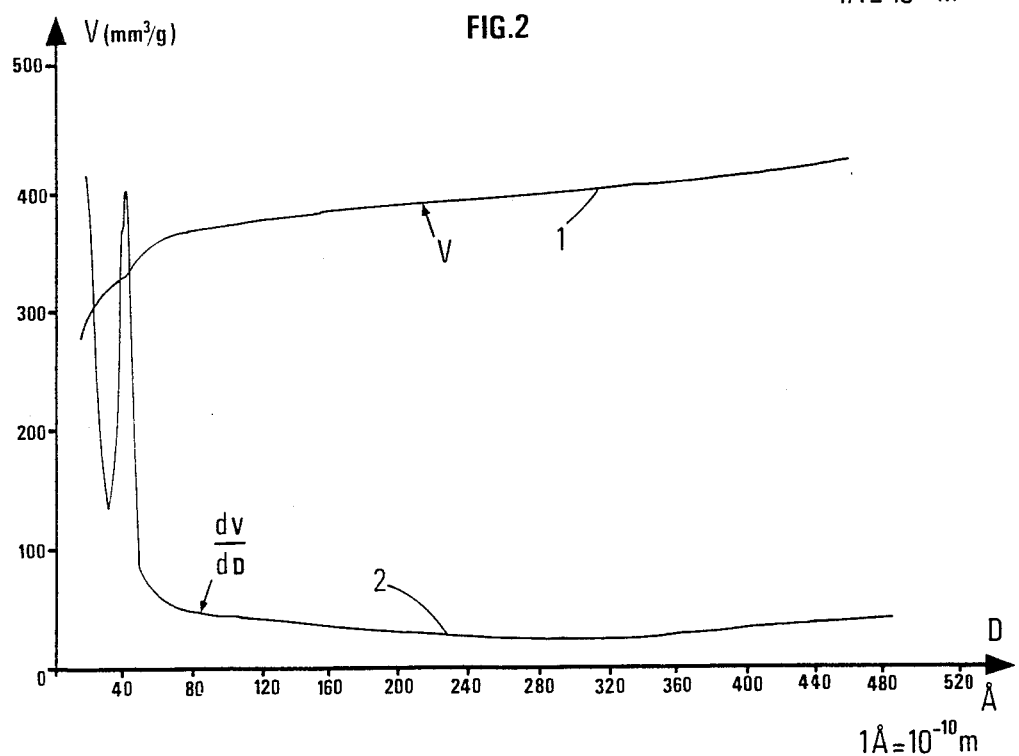

The starting Nay zeolite is subjected to the same exchanges and stabilising treatments as in Example 1. After the stabilisation, instead of making exchanges with ammonium ions an acid treatment follows under the following conditions:ratio between the volume of 2N nitric acid and weight of solid is 6, temperature is 95° C., and time 3 hours. Then another treatment under the same conditions is carried out, but with an acid of normality 0.3N. Molar ratio $SiO_2/Al_2O_3$ is then 18, the residual sodium level 0.2%, the crystalline parameter $24.32 \times 10^{-10}$ m, the specific surface area 805 m/g, the water take-up capacity 13.7% the sodium ion take-up capacity 1.8. The desorption isotherm of the nitrogen and the micropore distribution are shown in FIG. 2 (same definitions as for FIG. 1)

EXAMPLE 3

The Nay zeolite is subjected to two exchanges in ammonium chloride solutions so that the sodium level is 2.6%. The product is then introduced into a cold oven and then calcined in air at up to 400° C. At this temperature a corresponding flow rate of water is introduced into the calcination atmosphere, after vaporisation, at a partial pressure of 50.661 Pa. The temperature is then taken to 565° C. for 2 hours. The product is then subjected to an exchange with an ammonium chloride solution followed by a well controlled acid treatment under the following conditions: volume of 0.4N hydrochloric acid to weight of solid 10, time 3 hours. The sodium level drops then to 0.6%, the $SiO_2/Al_2O_3$ ratio is 7.2. This product is then subjected to sudden calcination in a static atmosphere at 780° C. for 3 hours, then again taken up in acid solution with hydrochloric acid of normality 2 and a ratio volume of solution to weight of zeolite 10. The crystalline parameter is $24.2 \times 10^{-10}$ m, the specific surface 825 m²/g, the water take-up capacity 11.7, the sodium ion take-up capacity 1.0: the pore distribution of the zeolite is shown in FIG. 2.

EXAMPLE 4

Preparation of catalysts A, B and C.
The zeolites of Examples 1, 2, and 3 are used to prepare catalysts of the following composition by weight:
13% zeolite
5% NiO
18% MoO
64% alumina The alumina is a pseudo-boehmite obtained by hydrolysis of an aluminum alcoholate. It is prepared by the addition of nitric acid so at to obtain a paste, then mixed at the same time with other ingredients: nickel nitrate, ammonium heptamolybdate and modified zeolite. After comalaxation, the mixture is extruded through a die of diameter 1.6 mm, then dried at 120° C. for 16 hours and calcined for 2 hours at 500° C., the rise in temperature being 2.5° C. per minute. To the zeolite described in Example 1 corresponds the catalyst A, to Example 2, the catalyst B, and to Example 3, the catalyst C.

EXAMPLE 5

Preparation of catalyst D
The zeolite of Example 2 is shaped by extrusion with a peptised alumina. The extrudates are dried and then calcined at 500° C. The support is then impregnated with aqueous solutions of ammonium tungstate and nickel nitrate. The composition of the catalyst calcined at 500° C. is as follows: 20% zeolite, 2.8% NiO, 21.9% WO, 55.3% of alumina.

EXAMPLE 6

Conditions of the test.
The catalysts whose preparations are described in the preceding examples are used under hydrocracking conditions on a charge whose characteristics are as follows:
charge
  Initial point 318
  10% Point 378
  50% Point 431
  90% Point 467
  Final Point 494

Density d 0.854
N (ppm) 980
% S 1.92

The catalytic test unit comprises a fixed bed reactor in "up flow" set-up wherein are introduced 60 ml of catalyst. The catalyst is presulphurated by a mixture $H_2/H_2S$ (97-3) up to 420° C. The pressure was 120 bar, the hydrogen recxcling 1000 liters per liter of charge, the hourly volumetric rate was 1.

EXAMPLE 7

Results.

The catalysts were compared at similar conversions and hence at different temperatures.

The conversion is defined as being a fraction of the received material with boiling point below 380°.

The selctivity is defined as being a fraction of the received material of boiling points comprised between 150° and 380°, brought back to conversion.

The results are presented in the table:

| CATALYST | T | CONVERSION | SELECTIVITY |
|---|---|---|---|
| A | 370 | 78.5 | 62.0 |
| B | 355 | 79.0 | 74.9 |
| C | 360 | 78.1 | 77.6 |
| D | 350 | 77.2 | 80.3 |

EXAMPLE 8

The catalysts A and B were compared in a low pressure test on a charge rather weakly polluted by sulfur and nitrogen. The aim was then hydrocracking at low pressure on a previoulsy hydrotreated charge;

A residue under vacuum of density (d 0.0906 and of sulfur content 2.37% was hydrotreated at 60 bar on a non acid conventional catalyst; the material received was distilled and the fraction 295–500 was in its turn hydrocracked on catalysts A and B 60 bar The charge had the following characteristics:

| $d_4^{20}$ | = 0.871 |
|---|---|
| S (ppm) | = 500 |
| N (ppm) | = 130 |

The pressure was 60 bar, the hydrogen recycling 700 liters of hydrogen per liter of charge, the hourly volumetric rate 1. The results are given in the following table:

| CATALYST | T | CONVERSION | SELECTIVITY |
|---|---|---|---|
| A | 365 | 73 | 40 |
|   | 350 | 55 | 63 |
| B | 350 | 75 | 55 |
|   | 335 | 57 | 73 |

EXAMPLE 9

10 g of HY zeolite obtained from Example 2 were dispersed in ground silica-alumina powder to obtain a mixture with 25% of zeolite (and 75% of silica-alumina). This mixture was then subjected to hydrothermic treatment intended to reduce its activity; 17 hours at 750° C. at a partial pressure of 1 bar (0.1 MPa) of water vapor.

The performances of the catalyst so obtained were evaluated in a cracking test on a fixed bed of gasoil under vacuum under the following conditions:
Amount of catalyst: 4.0 g
ratio by weight catalyst/charge=c/o=3.0
WHSV=15 $h^{-1}$
Reaction time ("time on stream")=75 s
Reactor temperature=480° C.
Charge:
Density at 15° C.=0.904
Aniline point=79° C.
% of weight S=1.3
% of weight N<0.1
Conradson carbon % weight=0.32
Ni+Vppm<1

| ASTM D 1160 | P.I | = 202° C. |
|---|---|---|
| | 10% | = 307° C. |
| | 50% | +402° C. |
| | 90% | = 510° C. |
| | M.P. | |

The results obtained are the following:

| % conversion | =72% |
|---|---|
| yield of gasoline $C_5^+$ | =56% |
| ratio $C_4^=/C_4$ | =3.2 |
| coke % weight | =2.0 |

EXAMPLE 10

10 g of HY zeolite obtained at the end of Example 2 were plunged into 100 cm of an aqueous 0.5M solution of lanthanum nitrate for 2 hours at ambiant temperature. The product was then washed with distilled water, and then dried at 150° C. for 4 hours and calcined 2 hours at 500° C. It was finally dispersed as in Example 9, and in the same proportions, into a silica-alumina powder and subjected to the same hydrothermic treatment as that applied in Example 9.

The performance of the catalyst so obtained were evaluated under the same conditions as those described in Example 9. The results were as follows:

| % conversion | = 73% |
|---|---|
| yield of $C_5^+$ gasoline | = 57% |
| ratio $C_4^=/C_4$ | = 3.0 |
| coke % weight | = 2.1 |

EXAMPLE 11 (COMPARATIVE)

An industrial fluidised bed cracking catalyst having the following characteristics was used:
% of matrix: 75% by weight (silica-alumina)
% of zeolite: 25%
Characteristic of the zeolite:

| Specific surface | = 148 $m^2 \cdot g^{-1}$ |
|---|---|
| Pore volume | = 0.31 $cm^3 \cdot g^{-1}$ |
| rare earths in % by weight (in metal) | = 1.9 |
| Fe O % by weight | = 0.65 |
| ABD (Apparent Bulk Density) | = 0.78 $g \cdot cm^{-3}$. |
| Na O (% by weight) | = 0.33 |

This catalyst is subjected to the same hydrothermic treatment as those of Examples 9 and 10, then to the same test as in the two Examples 9 and 10. The results obtained were:

| | |
|---|---|
| % conversion | = 68% |
| yield of $C_5^+$ gasoline | = 52% |
| ratio $C_4^=/C_4$ | = 2.1 |
| coke % by weight | = 2.7 |

We claim:

1. A catalyst containing by weight
(a) about 20 to 98% of a matrix comprising alumina, silica, silica-alumina, alumina boron oxide, magnesia, silica-magnesia, zirconia, titanium oxide, or clay,
(b) about 2 to 80% of a zeolite having:
   a molar ratio $SiO_2/Al_2O_3$ between about 12 and 40;
   a sodium content less than 0.15% by weight determined on the zeolite calcined at 1100° C.;
   a parameter ao of the elementary mesh comprised between $24.38 \times 10^{-10}$ m and $24.26 \times 10^{-10}$ m;
   a sodium ion take-up capacity ONa expressed in grams of sodium per 100 grams of zeolite modified, neutralized and calcined higher than about 0.85%;
   a specific surface higher than about 550 m²(g);
   a water vapor adsorption capacity at 25° C. (at a P/Po ratio equal to 0.10) higher than 6%;
(c) 0.01–5% b.w. of at least one noble Group VIII metal or metal compound, or 0.01–15% by weight of at least one group VIII non-noble metal or metal compound, said catalyst being produced by a process consisting essentially of mixing said matrix with said zeolite and introducing in one or several steps into the matrix, into the zeolite or into a mixture thereof, one or more metals or compounds of metals of group VIII or a mixture of metals of group VIII and group VI, and wherein the preparation of the zeolite consists essentially of
   lowering the sodium level of a NaY-zeolite to a value below 2.5% by weight by at least one exchange with a solution of an ionizable ammonium salt, so as to obtain an $NH_4NaY$ zeolite;
   calcining in at least one step the $NH_4NaY$ zeolite (hydrothermic treatment) between about 770° and 780° C., at a partial water vapor pressure between about 0.1 and 5 bar for at least 1 hour to obtain a stabilized zeolite, and treating the stabilized zeolite in at least one step by at least one solution of an organic or inorganic acid,
   whereby the resultant zeolite has a pore distribution comprising between 1 and 20% of the pore volume contained in pores of diameter situated between $20 \times 10^{-10}$ and $80 \times 10^{-10}$ m, the remainder of the pore volume being essentially contained in pores of diameter less than $20 \times 10^{-10}$ m.

2. A catalyst according to claim 1 containing by weight (a) 50 to 95% of a matrix of a silica-alumina, a silica-magnesia or a clay, and (b) 5 to 50% of the zeolite.

3. A catalyst according to claim 2 wherein the matrix contains in addition at least one other solid wherein the solid is an alumina, a silicas, a zirconia, an alumina boron oxide, a magnesia, or a titanium oxide.

4. A catalyst according to claim 2 wherein the zeolite contains at least one rare earth metal.

5. A catalyst according to claim 2 further containing (c) at least one platinum, rhenium, manganese, chromium, cobalt, nickel, or iron metal.

6. A catalyst according to claim 1, wherein the organic or inorganic acid is a hydrochloric or nitric acid solution having a normality of about 0.5–3.

7. A catalyst according to claim 1, wherein the normality of the acid solution is about 0.5–3N.

8. A catalyst according to claim 1, wherein the sodium ratio is lowered to a value below 0.7% by weight and wherein the temperature of the second hydrothermic treatment is about 770° C.

9. A catalyst according to claim 1, wherein the organic or inorganic acid is a hydrochloric or nitric acid solution having a normality of about 0.1–11.

10. A catalyst according to claim 1, wherein the sodium ratio is lowered to a value below 1.0% by weight and wherein the temperature of the second hydrothermic treatment is about 770° C.

* * * * *